Patented Mar. 14, 1933

1,901,278

UNITED STATES PATENT OFFICE

JAMES BADDILEY, OF MANCHESTER, AND JAMES HILL, OF GLASTONBURY, ENGLAND, ASSIGNORS TO IMPERIAL CHEMICAL INDUSTRIES LIMITED, OF WESTMINSTER, ENGLAND

SECONDARY DISAZO DYESTUFFS

No Drawing. Application filed July 21, 1932, Serial No. 623,906, and in Great Britain February 12, 1926.

In our application Ser. No. 145,910, which has matured into Patent No. 1,883,325 of which the present application is a continuation in part, we have disclosed new secondary disazo dyestuffs prepared by coupling the diazo compound of a nitro-amine of the benzene or naphthalene series with an amine to form a compound capable of re-diazotization, then re-diazotizing and combining with an amine of the benzene or naphthalene series or with a derivative thereof. The dyestuffs so prepared have the valuable property of dyeing the acetyl cellulose fiber in brown shades of excellent fastness to washing and light, and are represented by the following general formula $$(NO_2)_x-R-N=N-R-N=N-R-NH_2$$

in which $x$ is 1 or 2 and R represents an aromatic residue free from sulphonic acid or sulphonate groups. Dyes of this type are dark brown to black powders, insoluble in water and dissolving in concentrated sulphuric acid to form blue to violet solutions, yielding red-violet precipitates on dilution with water. They dye acetyl cellulose in even level brown shades.

The present invention is directed to a certain group of dyestuffs of the above described broad general class. It relates to those dyestuffs of the broad class in which the middle component is cresidine and an end component is m-toluidine. These dyestuffs are represented by the following general formula

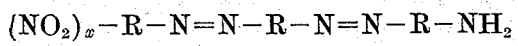

in which $x$ is 1 or 2 and R represents an aromatic residue free from sulphonic acid or sulphonate groups.

Suitable first components are m-nitroaniline, p-nitroaniline, 2:4-dinitroaniline, 4:5-dinitro-α-naphthylamine, and picramic acid. We have found that the dyestuff in which the first component is p-nitroaniline is especially advantageous for dyeing acetyl cellulose fiber in even level shades.

Thse dyestuffs are dark brown to black powders, insoluble in water and dissolving in concentrated sulphuric acid to form blue to violet solutions, yielding red-violet precipitates on dilution with water. They dye acetyl cellulose in even level brown shades.

The following are examples of the way in which the new dyestuffs may be prepared:—

Example 1

138 parts of p-nitroaniline are diazotized in the usual way and into the diazo solution is poured a solution of cresidine (4-alkoxy-3-aminotoluene), prepared by dissolving 137 parts of cresidine in 370 parts of 10 per cent hydrochloric acid and 1000 parts of water. When the combination is complete, 370 parts of 10 per cent hydrochloric acid are added and then 69 parts of sodium nitrite, the mixture being stirred until diazotization is complete. A solution of 107 parts of m-toluidine in 370 parts of 10 per cent hydrochloric acid and 1000 parts of water is then poured into the diazo solution and sodium acetate added to complete the combination. The dyestuff is then isolated in the usual way. It has the probable formula.

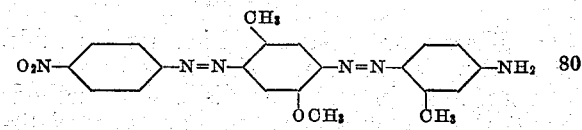

It is a black powder, insoluble in water, dissolving in concentrated sulphuric acid to a violet solution. It dyes acetate silk in a full brown shade.

If metanitroaniline or picramic acid is used in place of paranitroaniline in the above reaction there are obtained other dyestuffs which also are useful in dyeing acetyl cellulose in even level shades. These modifications of Example 1 produce dyestuffs having a structure, which in the case of metanitroaniline is probably

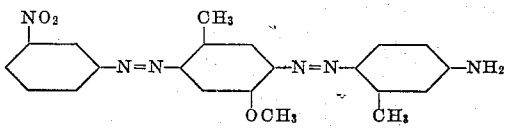

and in the case of picramic acid probably is

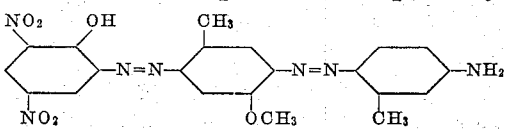

Example 2

183 parts 2:4-dinitroaniline are diazotized by the aid of nitrosyl sulphuric acid and to the diluted diazo solution is added a solution of 137 parts of the cresidine solution prepared as stated in Example 1. Sodium acetate is then added to complete the coupling and the dyestuff is filtered off and made into a thin paste with water. It is then acidified with 925 parts of 10 per cent hydrochloric acid and diazotized by the addition of 69 parts of sodium nitrite. To the mixture is then added a solution of 107 parts of m-toluidine in 370 parts of 10 per cent hydrochloric acid and 1000 parts of water. Sodium acetate is then added to complete the combination. The dyestuff is then isolated in the usual way. The dyestuff produced has the probable formula

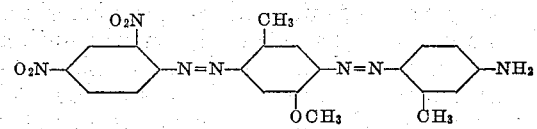

It dyes the acetyl cellulose in the brown shades. If 4:5-dinitro-α-naphthylamine is substituted for the 2:4-dinitroaniline in the above reaction, there is obtained a dyestuff which is valuable for dyeing acetyl cellulose in even level shades and which has the probable formula

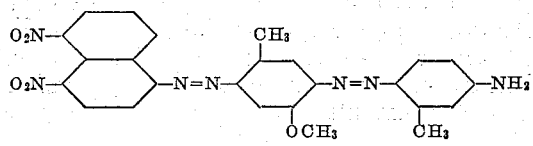

These new dyestuffs, which are insoluble, are applied to acetyl silk directly from a suspension in water or dispersing methods may be employed, for example, the use of dispersing agents such as the acid resins, lignone sulphonic acid, and the like; protective colloids, thickeners and/or solvents may also be added, if desired.

The following is an example of a dyeing process using the dyestuffs herein described but we in nowise limit ourselves to the details given therein.

Example 3

A dyestuff paste containing one part of the dyestuff prepared according to Example 1 is added to a dyebath containing a very small amount (about 1/100th part) of the acid resin obtained by condensing naphthalene sulphonic acid and formaldehyde and to the lukewarm dyebath is then added 100 pounds of cellulose acetate yarn. The temperature is raised to 80° C. during half an hour and the material is dyed for a further half an hour at this temperature. It is then washed and dried in the usual way, giving a full brown dyeing of even level shade.

What we claim and desire to secure by Letters Patent is:—

1. The process of manufacturing new secondary disazo dyestuffs, suitable for dyeing acetyl cellulose in even level shades, which comprises combining a diazotized nitroamine of the benzine or naphthalene series, including derivatives thereof except sulphonic acids and sulphonates with cresidine, rediazotizing and combining with m-toluidine, to produce dyes having the general formula

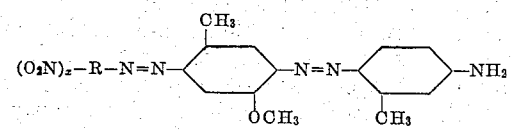

where $x$ is 1 or 2 and R represents an aromatic residue free from sulphonic acid or sulphonate groups and which dye acetyl cellulose in even level shades.

2. The process of manufacturing new secondary disazo dyestuffs suitable for dyeing acetyl cellulose in even level brown shades, which comprises combining diazotized paranitroaniline with cresidine, rediazotizing and combining with meta-toluidine to produce a dyestuff having the probable formula

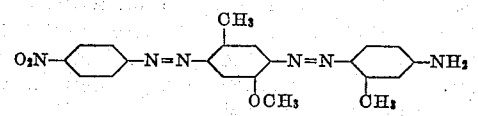

and dyeing acetyl cellulose in even level shades.

3. As new secondary disazo dyestuffs suitable for dyeing acetyl cellulose, the dyestuffs having the general formula

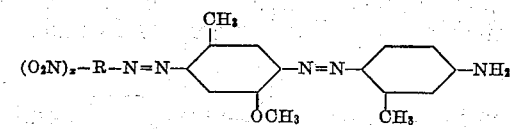

where $x$ is 1 or 2 and R represents an aromatic residue free from sulphonic acid or sulphonate groups, and which dye acetyl cellulose in even level brown shades, the said dyestuffs being dark brown to black powders, insoluble in water and dissolving in concentrated sulphuric acid to form blue to violet solutions, yielding red-violet precipitates on dilution with water.

4. As new secondary disazo dyestuffs suitable for dyeing acetyl cellulose, the dyestuffs having the general formula

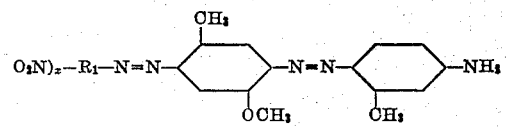

where $x$ is 1 or 2, and $R_1$ represents an aromatic monocyclic residue free from sulphonic acid or sulphonate groups and which dye acetyl cellulose in even level brown shades, the said dyestuffs being dark brown to black powders, insoluble in water and dissolving in concentrated sulphuric acid to form blue to violet solutions, yielding red-violet precipitates on dilution with water.

5. The new secondary disazo dyestuff suitable for dyeing acetyl cellulose in even level shades, having the probable formula

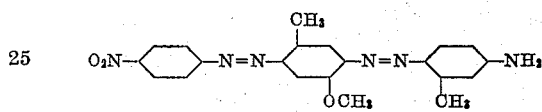

and which dyes acetyl cellulose an even level full brown shade, the said dyestuff being a black powder, insoluble in water, and dissolving in concentrated sulphuric acid to a violet solution.

In testimony whereof we affix our signatures.

JAMES BADDILEY.
JAMES HILL.